United States Patent [19]
Yoshino et al.

[11] Patent Number: 5,175,462
[45] Date of Patent: Dec. 29, 1992

[54] TOROIDAL COIL MOTOR

[75] Inventors: Daisuke Yoshino; Hiroshi Makino; Tomoharu Nonaka; Masahiro Takahashi; Tetsuya Kimura, all of Kanagawa, Japan

[73] Assignee: Fuji Xerox Co., Ltd., Tokyo, Japan

[21] Appl. No.: 753,359

[22] Filed: Aug. 30, 1991

[51] Int. Cl.⁵ .................. H02K 01/12; H02K 05/00
[52] U.S. Cl. ............................. 310/164; 310/91; 310/217; 310/254
[58] Field of Search ............... 310/65, 89, 164, 254, 310/256, 67 R, 91, 179, 180, 191, 216, 217, 218, 259, 90, 90.5

[56] References Cited

U.S. PATENT DOCUMENTS

| | | | |
|---|---|---|---|
| 3,394,276 | 7/1968 | Cafici | 310/67 R |
| 3,465,188 | 9/1969 | Sisk | 310/217 |
| 3,466,518 | 9/1969 | Aylikci et al. | 318/138 |
| 3,512,021 | 5/1970 | Laurent, Jr. | 310/67 |
| 3,693,035 | 9/1972 | Ostwald | 310/51 |
| 3,749,954 | 7/1973 | Anderson, Jr. | 310/90 |
| 4,135,107 | 1/1979 | Kamerbeek et al. | 310/179 |
| 4,200,344 | 4/1980 | Binns et al. | 310/90.5 |
| 4,494,030 | 1/1985 | Mulach et al. | 310/256 |
| 4,523,800 | 6/1985 | Yamashita et al. | 350/6.7 |
| 4,629,919 | 12/1986 | Merkle | 310/90 |
| 4,934,781 | 6/1990 | Kato et al. | 350/6.8 |
| 5,027,026 | 6/1991 | Mineta et al. | 310/259 |
| 5,069,515 | 12/1991 | Itami et al. | 359/200 |

Primary Examiner—Steven L. Stephan
Assistant Examiner—D. R. Haszko
Attorney, Agent, or Firm—Finnegan, Henderson, Farabow, Garrett and Dunner

[57] ABSTRACT

A toroidal coil motor characterized by the provision of an annular iron core in which laminate-fixing holes whose number is the least common multiple with respect to the number of magnetic poles and the number of toroidal coils are provided symmetrically in a direction of the circumference of the annular iron core.

5 Claims, 4 Drawing Sheets

TOROIDAL COIL MOTOR

BACKGROUND OF THE INVENTION

This invention relates to a toroidal coil motor in which toroidal coils are wound about an annular iron core to form a stator portion. A rotor portion with a magnet is rotatably provided in a central opening of the stator.

FIG. 1 shows a conventional toroidal coil motor. In FIG. 1, reference numeral 1 denotes an annular, iron core, reference numeral 2 denotes a n-pole, reference numeral 3 denotes a s-pole, reference numeral 4 denotes a rotation shaft, reference numerals 5 to 10 denote toroidal coils, reference numerals 11 to 13 denote laminate-fixing holes, and reference character R denotes a rotor portion.

FIG. 1 illustrates a top view as seen from the direction of the axis of the toroidal coil motor. The annular iron core 1 is formed by a plurality of silicon steel plates laminated in a direction perpendicular to the sheet of this Figure. The laminated plates are fixed together by passing laminate-fixing members respectively through the laminate-fixing holes 11 to 13. The laminate-fixing members are not shown in FIG. 1, for the ease of description.

FIG. 2 is a cross-sectional view in the vicinity of the line II—II of FIG. 1, that is, in the vicinity of the laminate-fixing member. In FIG. 2, the laminate-fixing member is designated 17. The silicon steel plates are designated 1-1.

After the silicon steel plates 1-1 are laminated together, the laminate-fixing member 17 is passed through the preformed laminate-fixing hole 11, and the laminated plates are fixed together, for example, by deforming the end of the laminating-fixing member 17.

Referring again to FIG. 1, the toroidal coils 5 to 10 are wound about the annular iron core 1 formed in the above-mentioned manner. In the example shown in FIG. 1, the number of the toroidal coils is six, but is not limited to six; however, each toroidal coil is designed to be connected to the toroidal coil spaced 180° therefrom, and therefore the total number of the toroidal coils is always even.

The rotor portion R has a magnet having a required number of pairs of poles (In FIG. 1, one n-pole and one s-pole), and this rotor portion is rotatably provided in a central opening of the annular iron core 1.

In the toroidal coil motor of the above construction, the electric current flowing through the toroidal coils 5 to 10 is controlled by a signal from a magnetic pole position detection element 22, thereby producing an electromagnetic force rotating in a predetermined direction relative to the rotor portion R.

However, the above-mentioned conventional toroidal motor has a problem that the distribution of the magnetic flux in the annular iron core is not even or equal relative to the magnetic poles, so that the rotation is not effected smoothly (Microscopically, the rotational speed increases or decreases).

The above problem arises from the number and positions of the laminate-fixing holes.

Conventionally, the number and positions of the laminate-fixing holes 11 to 13 have been determined only depending on whether or not the number and positions are sufficient to fix the laminated silicon steel plates, without taking the number of the toroidal coils and the number of the magnetic poles of the rotor portion, R into consideration. As a result, in many cases, the traditional number of the laminate-fixing holes has been 3 or 4, and they have been positioned symmetrically.

With such an arrangement, the distribution of the magnetic flux in the annular iron core 1 is uneven relative to the magnetic poles of the rotor portion R, as described by the following. Arrows indicated by dotted lines in FIG. 1 show the paths of the magnetic flux produced by electric current flowing through the toroidal coils. Namely, the laminate-fixing holes 11 to 13 offer a greater magnetic resistance that the silicon steel plates 1-1 do, and therefore the path of the magnetic flux takes a great bend to avoid the laminate-fixing hole. On the other hand, at those portions of the laminate where no laminate-fixing hole is provided (for example, at that portion between the toroidal coils 5 and 6), the magnetic flux does not bend as described above, but flows in the circumferential direction.

A line B—B of FIG. 1 represents an extension line of the boundary between the n-pole 2 and the s-pole 3. When the rotational position of the rotor portion R is as in FIG. 1, that portion of the annular iron core 1 facing the n-pole 2 is disposed above the line B—B, and that portion of the annular iron core 1 facing the s-pole 3 is disposed below the line B—B.

When the magnetic flux distribution at that portion of the annular iron core 1 facing the n-pole 2 is compared with the magnetic flux distribution at that portion of the annular iron core 1 facing the s-pole 3, they are different from each other.

This discrepancy will now be described, taking one portion as an example. For example, note the portion of the annular iron core 1 disposed on the left side of the n-pole 2 in FIG. 1. This portion is an upper half of the portion of the annular iron core lying between the toroidal coils 9 and 10. The magnetic flux can pass through this portion in the circumferential direction without being disturbed by a laminate, fixing hole 11-13.

On the other hand, the portion of the annular iron core 1 facing the s-pole 3, a portion corresponding to the above-mentioned portion between toroidal coils 9 and 10 but disposed symmetrically therefrom across the rotational shaft 4, portion is the lower half of that portion lying between the toroidal coils 7 and 6. However, since the laminate-fixing hole 12 is provided in this portion, the magnetic flux takes a great bend to pass past this portion. Namely, the magnetic flux distribution is not even relative to the magnetic poles.

However, arrows are provided on both ends of a dotted line shown in drawing, since a direction of the magnetic flux distribution is changed in accordance with a direction of the electric current.

SUMMARY OF THE INVENTION

It is an object of this invention to overcome the above problem.

The above object has been achieved by a toroidal coil motor, characterized by the provision of an annular iron core in which the number of laminate-fixing holes is the least common multiple with respect to the number of magnetic poles and the number of toroidal coils, and the laminate-fixing holes are provided symmetrically in a direction of the circumference of the annular iron core.

By providing the laminate-fixing holes in the above manner, the positions of the toroidal coils and the positions of the laminate-fixing holes relative to the magnetic poles are made geometrically even.

As a result, the magnetic flux distribution at those portions of the annular iron core facing the magnetic poles, are made even, so that the rotor portion can be rotated smoothly.

DESCRIPTION OF THE PREFERRED EMBODIMENT

A preferred embodiment of the present invention will now be described in detail with reference to the drawings.

Figure 3:
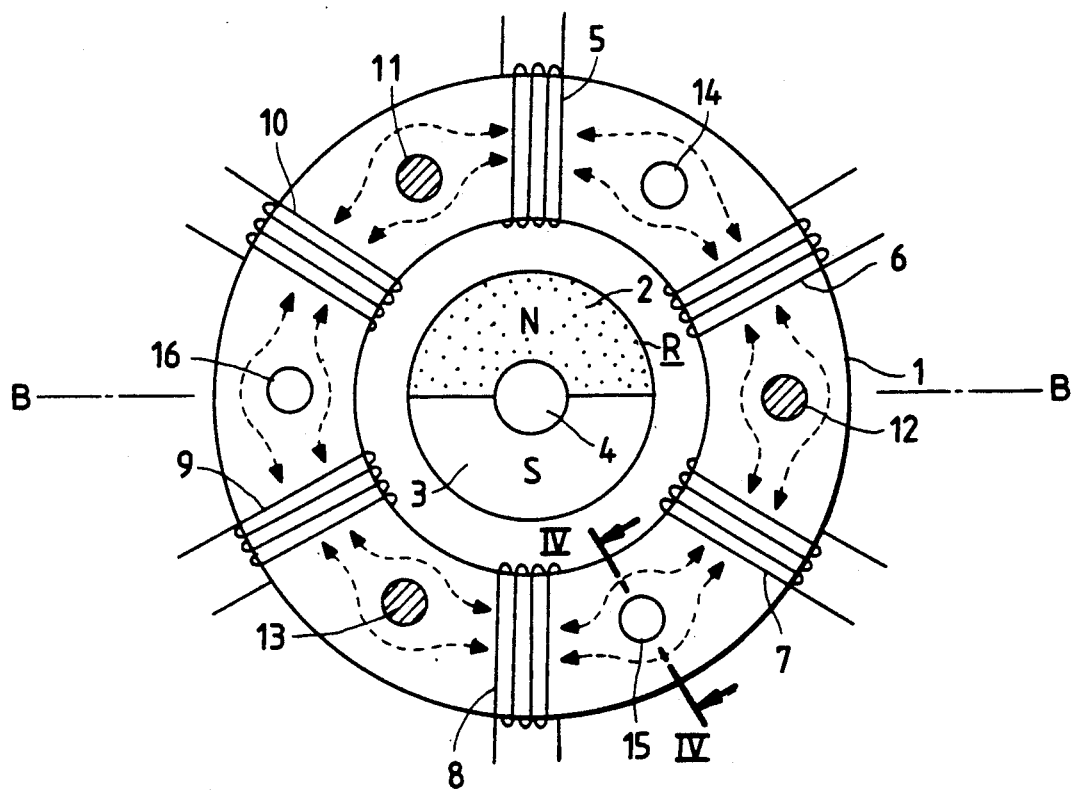
FIG. 3 is a view of a preferred embodiment of a toroidal coil motor of the present invention.

FIG. 3 shows a toroidal coil motor according to the present invention. Like reference numerals denote corresponding parts in FIG. 3 and FIG. 1. Reference numerals 14 to 16 denote laminate-fixing holes.

Figure 1:
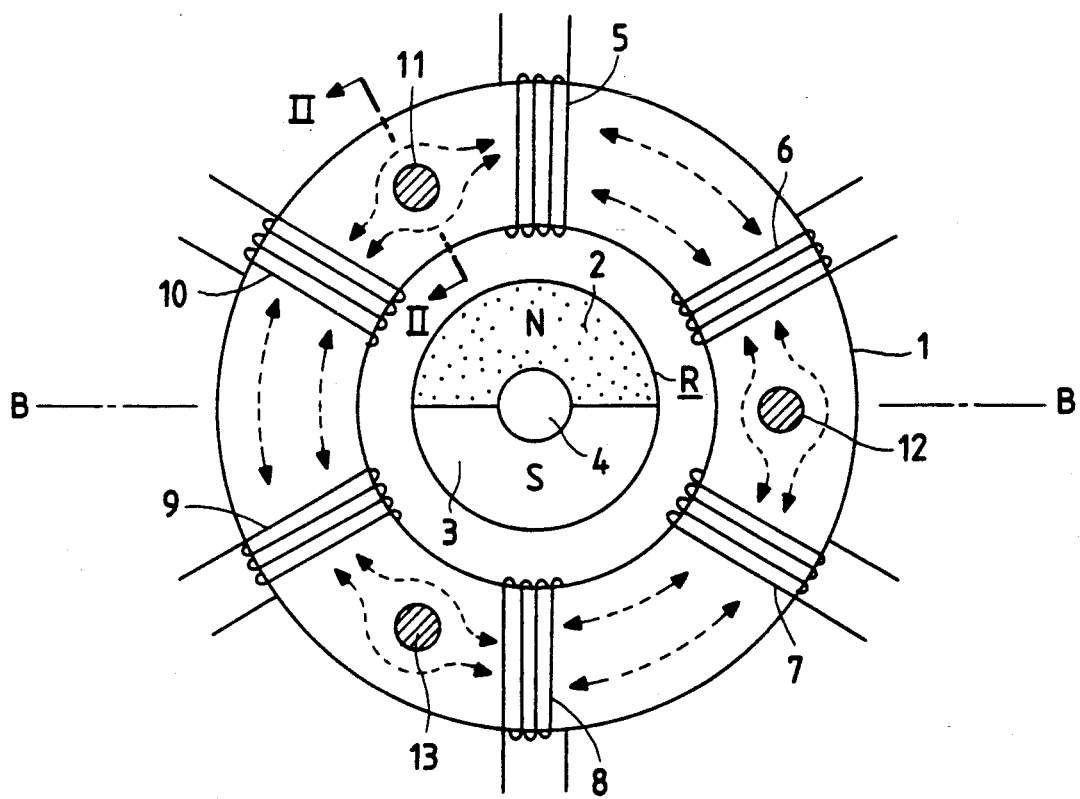
FIG. 1 is a view of a conventional toroidal coil motor.
Figure 2:
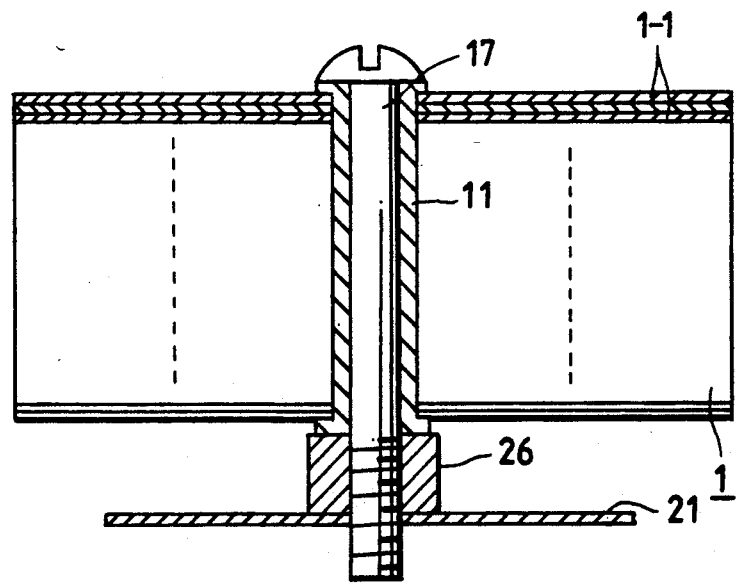
FIG. 2 is a cross-sectional view through the vicinity of an annular iron core.

This embodiment differs in construction from the prior art of FIG. 1 in that the number and positions of the laminate-fixing holes are determined in view of the number of magnetic poles of a rotor portion R and the number of toroidal coils so that the distribution of the magnetic flux at that portion of an annular iron core facing each magnetic pole can be even. More specifically, among numbers which are equal to or a multiple of the number of the magnetic poles and also are equal to or a multiple of the number of the toroidal coils, the least number of the laminate-fixing holes are provided symmetrically in the circumferential direction.

In the example shown in FIG. 3, the number of magnetic poles is 2, and the number of toroidal coils is 6. Therefore, the least common multiple with respect to the number of the magnetic poles and the number of the toroidal coils is 6. Therefore, the number of the laminate-fixing holes is determined to be 6, and these holes are positioned symmetrically in the circumferential direction of the annular iron core. In FIG. 3, although each of the laminate-fixing holes are provided just at a mid point between the adjacent toroidal coils, the laminate-fixing holes may not be provided at the mid points so far as the symmetrical arrangement is kept in the circumferential direction. For example, the laminate-fixing holes may be provided respectively at positions advanced the same distance clockwise from the respective toroidal coils.

The reason why the smallest common multiple is selected is to keep the magnetic resistance of the annular iron core to as small a value as possible. The larger the number of the laminate-fixing holes, the higher the magnetic resistance.

With the above arrangement of the laminate-fixing holes, the toroidal coils and the laminate-fixing holes are always disposed geometrically and symmetrically with respect to the magnetic poles. Therefore, the magnetic flux distribution at those portions through which an extension line B—B of the boundary between the magnetic poles is always even relative to the magnetic poles even when the rotor portion R rotates (that is, the line B—B rotates). Therefore, an unbalance of the magnetic resistance relative to the magnetic poles is eliminated, so that the rotor R can be rotated smoothly.

Although the laminate-fixing holes are provided, it is not always necessary to pass the laminate-fixing members respectively through all of the laminate-fixing holes for fixing purposes. It is only necessary to pass the laminate-fixing members respectively through those laminate-fixing holes which are considered necessary to be used. The other laminate-fixing holes may remain intact, or may be used for another purpose as shown in FIG. 4.

Figure 4:
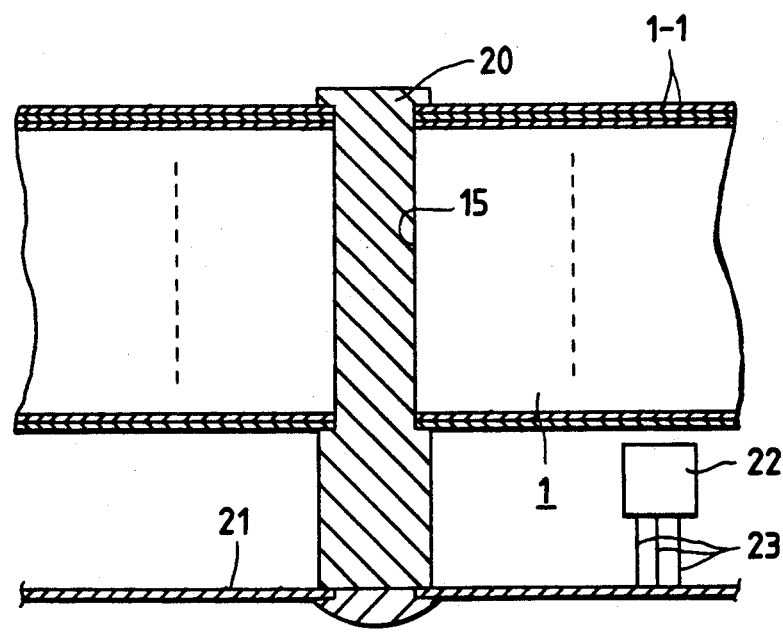
FIG. 4 is a cross-sectional view showing an example in which each spare laminate-fixing hole is used for passing a board support member therethrough as indicated by II—II.

FIG. 4 shows an example in which each spare laminate-fixing hole is used for passing a board support member therethrough. In FIG. 4, reference numeral 15 denotes the spare laminate-fixing hole, reference numeral 20 the board support member, reference numeral 21 a board, reference numeral 22 a magnetic pole position detection element, and reference numeral 23 a lead wire.

In the toroidal coil motor, the direction of flow of electric current through each toroidal coil, as well as the timing of flowing the electric current, is controlled by detecting a change of the magnetic poles of the rotor portion R. This detection is effected by a magnetic pole position detection element 22 provided in the vicinity of the rotor portion R. This magnetic pole position detection element 22 is mounted on the fixed board 21 in an upstanding manner.

In FIG. 4, the board 21 is fixed by the board support member 20 passing through the spare laminate-fixing hole 15 (one or more of spare laminate-fixing holes 15 may be used according to the need) in such a manner that the board 21 is spaced a predetermined distance from the lower surface of the annular iron core 1.

The board support member 20 may be of a construction not only to support the board 21 but also to fix the laminated silicon steel plates 1-1.

Figure 5:
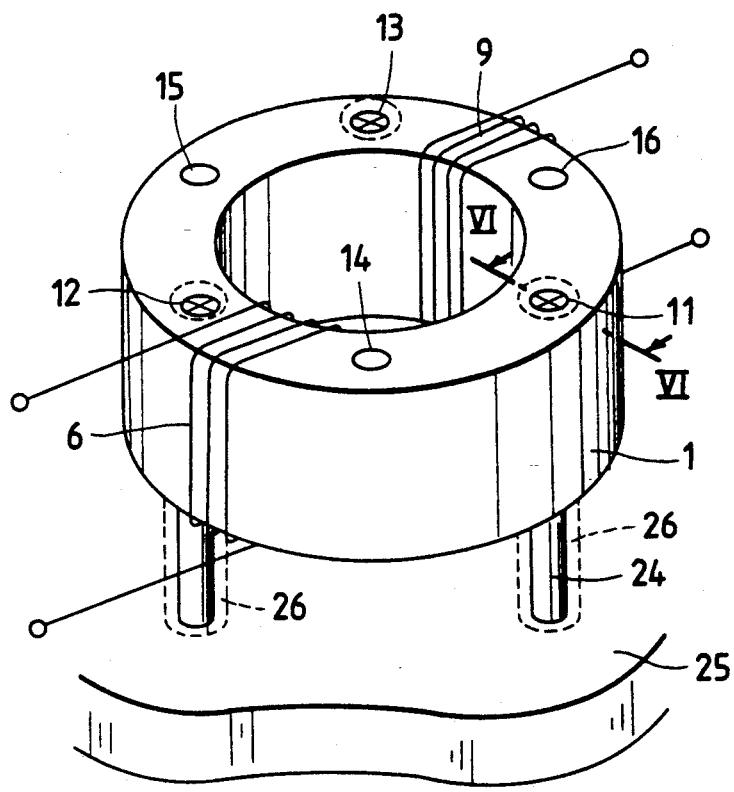
FIG. 5 is a perspective view, with parts cut away, showing a stator core and its relevant components.
Figure 6:
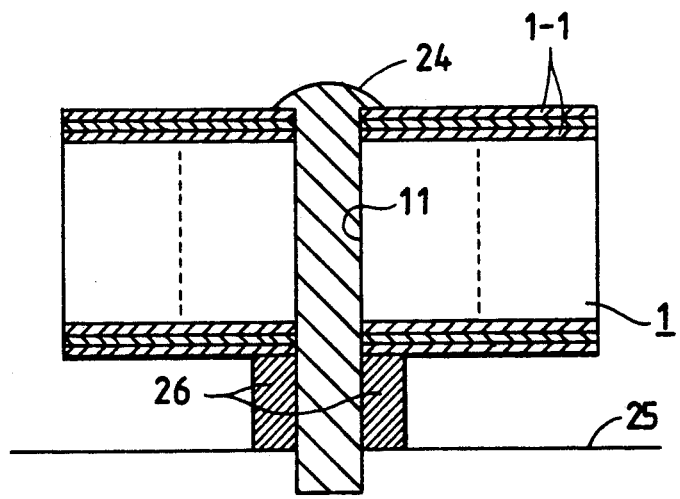
FIG. 6 is a sectional view taken along line VI—VI in FIG. 5, which shows another example in which each spare laminate-fixing hole is used for passing board support member therethrough.
Figure 7:
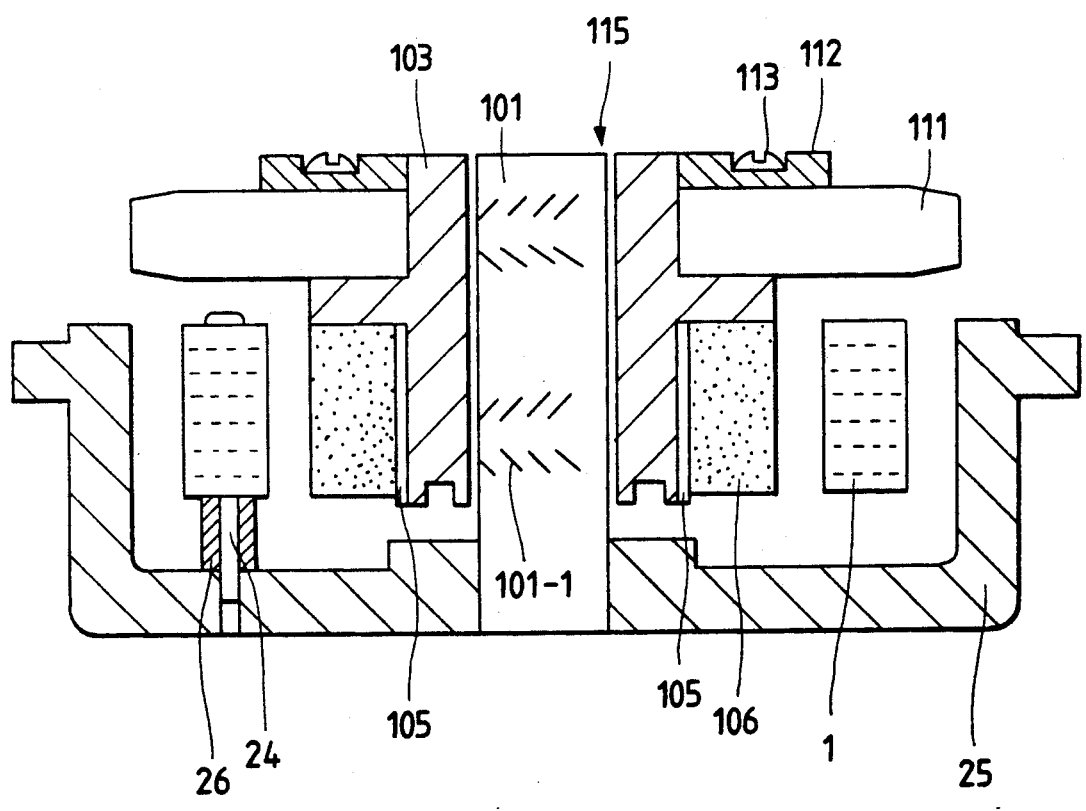
FIG. 7 is a sectional view of an example of an electric motor in which the another example shown in FIG. 6 is utilized.

FIG. 5, 6 and 7 shows another embodiment of the present invention. In FIG. 5, reference numerals 6 and 9 designate toroidal coils. Only two toroidal coils 6 and 9 are shown; however, it should be noted that the number of toroidal coils 6 and 9 provided to the core 1 may actually be six as shown in FIG. 3.

The stator core 1 is formed by a laminate of thin magnetic plates (such as silicon steel plates) which are tightened with a housing support member 24.

FIG. 6 is a sectional view taken along line VI—VI in FIG. 5 showing the housing support member 24. As is apparent from FIG. 6, spacers 26 are further formed so as to provide a predetermined distance between a housing 25 and the core 1.

FIG. 7 is a sectional view of an example of an toroidal coil motor in which the example shown in FIG. 6 is utilized. In this example, a load to be rotated by the toroidal coil motor is a polygon mirror of a light deflector.

In FIG. 7, reference numeral 101 denotes a shaft, reference numeral 101-1 dynamic pressure-generating grooves, reference numeral 25 a housing, reference numeral 103 a rotation sleeve, reference numeral 105 a yoke, reference numeral 106 a magnet, reference numeral 1 a core, reference numeral 111 a polygon mirror, reference numeral 112 a flange, reference numeral 113 a screw, and reference numeral 115 a gap.

One end of the shaft 101 is fixedly secured to the housing 25. The dynamic pressure-generating grooves 101-1 which serve as a radial bearing are formed in the surface of the shaft 101. Even when a force acts on the rotation shaft in a direction perpendicular thereto, the radial bearing serves to prevent the axis of rotation from being displaced from a predetermined position.

A rotor portion of the motor is fitted on the shaft 101 with the gap 115 therebetween, and is constituted by the rotation sleeve 103, the yoke 105 fixedly mounted this sleeve by press-fitting or an adhesive, and the magnet 106.

The polygon mirror 111 is mounted on this rotor portion. For achieving this mounting, a central hole of the polygon mirror 111 is fitted on the rotation sleeve 103, and then the flange 112 is held against the polygon mirror from above, and the polygon mirror is fixed to the rotation sleeve 103 by the screws 113.

A stator portion of the motor is constituted by the housing 25, the shaft 101 having one end fixedly secured to the housing 25 by press-fitting or the like, the core 1 fixed to the housing 25 by the housing support member 24 together with the spacer 26, etc. The toroidal coils are wound about the core 1.

The magnet 106 is a permanent magnet, and a magnetic attractive force is exerted between this magnet and the core 1 disposed in opposed relation thereto. This attractive force serves to prevent the opposed magnet 106 and core 1 from being displaced relative to each other in the direction of the axis of the motor (i.e., in a direction of thrust).

Namely, in FIG. 7, when the magnet 106 is moved upward, a component for moving the magnet downward appears in the above attractive force, so that the magnet is moved downward. Also, when the magnet is moved downward, a component for moving the magnet upward appears in the attractive force, so that the magnet is moved upward. Thus, due to the above magnetic attractive force, the magnet 106 and the core 1 are caused to be opposed to each other at the predetermined position in the axial direction. Namely, a magnetic thrust bearing is constituted by the magnet 106 and the core 1.

When the rotation sleeve 103 rotates, a layer of the air of high pressure is produced by the dynamic pressure-generating grooves 101-1 around the shaft 101, that is, in the gap 115. Due to this pressure, the rotation sleeve 103 is borne in floating relation to the shaft 101. Namely, a dynamic pressure air bearing is formed.

Incidentally, in the above example, although the dynamic pressure-generating grooves are formed in the outer peripheral surface of the shaft 101, they may be formed in the inner surface of the rotation sleeve 103.

The above air layer serves to keep the axis of rotation of the rotor portion at a predetermined position. For example, when the rotation sleeve 103 is displaced to the right direction, the right-side portion of the gap becomes greater, so that the pressure at this portion becomes lower than before the displacement occurs. On the other hand, since the left-side portion of the gap becomes smaller, the pressure at this portion becomes higher than before the displacement occurs. When the pressure distribution is in the above condition, the rotation sleeve 103 is urged to the left, and is finally returned to its initial position.

The polygon mirror 111 has a polygonal shape when viewed from above in the axial direction, and has a number of mirror surfaces at its peripheral surface.

As described above, the toroidal coil motor of the present invention comprises the annular iron core in which the laminate-fixing holes whose number is the least common multiple with respect to the number of the magnetic poles and the number of the toroidal coils are provided symmetrically in the direction of the circumference of the annular iron core. Therefore, the positions of the toroidal coils and the positions of the laminate-fixing holes relative to the magnetic poles are made geometrically even. Therefore, the magnetic flux distribution at those portion of the annular iron core facing the magnetic poles, respectively, are made even, so that the rotor portion can be rotated smoothly.

What is claimed is:

1. A toroidal coil motor comprising:
   a housing;
   a shaft fixedly mounted at one end on said housing;
   a rotation sleeve loosely fitted on said shaft;
   a magnet fixedly mounted on said rotation sleeve through a magnet yoke, said magnet having a plurality of magnetic poles;
   a stator core fixedly mounted on said housing by a plurality of laminate-fixing ties of a non-magnetic material, said stator core being composed of a toroidal core having a central axis and comprising an annular iron core and a plurality of toroidal coils wound about said annular iron core, said toroidal core having a plurality of holes axially disposed therethrough, said plurality of holes being angularly and symmetrically disposed in a direction of a circumference of said toroidal core;
   a motor rotation control board;
   at least one member inserted into one of said holes for mounting and maintaining said motor rotation control board at a predetermined position with respect to said toroidal core; and
   a magnetic pole position detection element on said motor rotation control board for detecting the rotational position of said plurality of magnetic poles of said magnet;
   wherein the sum of said holes corresponds to a whole, even, common multiple of the number of said magnetic poles and the number of said toroidal coils; and
   wherein said plurality of laminate-fixing ties extends through a fraction of said plurality of holes for fixing said toroidal core to said housing.

2. A toroidal coil motor according to claim 1, further comprising a plurality of pressure-generating grooves disposed in said shaft for generating air pressure between said shaft and said rotation sleeve to maintain said rotation sleeve at a predetermined position with respect to said shaft.

3. A toroidal coil motor according to claim 1, further comprising a plurality of pressure-generating grooves disposed in said rotation sleeve for generating air pressure between said shaft and said rotation sleeve to maintain said rotation sleeve at a predetermined position with respect to said shaft.

4. A toroidal coil motor according to claim 1, further comprising a plurality of spacers disposed between said toroidal core and said housing around said plurality of laminate-fixing ties for maintaining said toroidal core at a predetermined position with respect to said housing.

5. A toroidal coil motor according to claim 1, wherein said plurality of laminate fixing ties through the fraction of said plurality of holes being symmetrically disposed about said central axis.

* * * * *